(12) United States Patent
Luce

(10) Patent No.: US 10,829,207 B2
(45) Date of Patent: Nov. 10, 2020

(54) NON-JAMMING SHRINK LATCH MECHANISM

(71) Applicant: Goodrich Corporation, Charlotte, NC (US)

(72) Inventor: William E. Luce, Colleyville, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 277 days.

(21) Appl. No.: 15/841,757

(22) Filed: Dec. 14, 2017

(65) Prior Publication Data

US 2019/0185146 A1    Jun. 20, 2019

(51) Int. Cl.
| | |
|---|---|
| *B64C 25/26* | (2006.01) |
| *B64C 25/12* | (2006.01) |
| *B64C 25/20* | (2006.01) |
| *B64C 25/00* | (2006.01) |

(52) U.S. Cl.
CPC .............. *B64C 25/26* (2013.01); *B64C 25/12* (2013.01); *B64C 25/20* (2013.01); *B64C 2025/006* (2013.01); *B64C 2025/008* (2013.01); *B64C 2025/125* (2013.01)

(58) Field of Classification Search
CPC ......... B64C 25/12; B64C 25/20; B64C 25/26; B64C 25/10; B64C 2025/006; B64C 2025/008; B64C 2025/125
USPC ................................................... 244/102 SS
See application file for complete search history.

(56) References Cited

U.S. PATENT DOCUMENTS

| | | | |
|---|---|---|---|
| 2,643,834 A | 6/1953 | Watman | |
| 3,136,506 A * | 6/1964 | Dowty | B64C 25/12 244/102 R |
| 3,954,232 A | 5/1976 | Harper | |
| 4,228,975 A * | 10/1980 | Sealey | B64C 25/14 244/102 R |
| 5,310,140 A | 5/1994 | Veaux et al. | |
| 6,811,118 B2 | 11/2004 | Collet et al. | |
| 7,883,125 B2 | 2/2011 | Smith, III | |
| 2015/0069178 A1 | 3/2015 | Brown | |

FOREIGN PATENT DOCUMENTS

| | | |
|---|---|---|
| EP | 2138398 | 12/2009 |
| EP | 3335988 | 6/2018 |
| GB | 568644 | 4/1945 |
| GB | 950324 | 2/1964 |

OTHER PUBLICATIONS

European Patent Office, European Search Report dated Apr. 5, 2019 in Application No. 18212781.1.
European Patent Office, European Office Action dated Apr. 16, 2020 in Application No. 18212781.1.

* cited by examiner

*Primary Examiner* — Richard R. Green
*Assistant Examiner* — Arfan Y. Sinaki
(74) *Attorney, Agent, or Firm* — Snell & Wilmer L.L.P.

(57) ABSTRACT

A non jamming shrink latch is provided and may comprise a cradle, a first rocker arm, a first inboard pivot, and a first outboard pivot, wherein the first inboard pivot is coupled to the first rocker arm at a first end and the first outboard pivot is coupled to the first rocker arm at a second end opposite the first end, and wherein the cradle is coupled to the first outboard pivot. In various embodiments, a non jamming shrink latch may further comprise a second rocker arm coupled to the cradle at a second outboard pivot and a second inboard pivot coupled to the second rocker arm opposite the second outboard pivot.

16 Claims, 8 Drawing Sheets

NON-JAMMING SHRINK LATCH MECHANISM

FIELD

The present disclosure relates to aircraft retractable landing gear systems, and, more specifically, to systems and methods for deploying a shrinking landing gear shock strut.

BACKGROUND

Landing gear supports an aircraft while the aircraft is on the ground. Landing gear may include one or more wheels and a shock strut assembly in order to attenuate the forces associated with landing. A shock strut assembly may have a length greater than the wheel well of the aircraft and may be commanded shrink lengthwise (a shrinking strut) in order to fit within the wheel well when retracted and may be commanded to unshrink lengthwise when extended. A shrinking strut introduces a safety hazard whereby the shrinking strut may unshrink when retraced and inhibit safe operation of the landing gear by tending to prevent the landing gear from extending from a retracted to a down and locked position.

SUMMARY

In various embodiments, a non jamming shrink latch is provided and may comprise a cradle, a first rocker arm, a first inboard pivot, and a first outboard pivot, wherein the first inboard pivot is coupled to the first rocker arm at a first end and the first outboard pivot is coupled to the first rocker arm at a second end opposite the first end, and wherein the cradle is coupled to the first outboard pivot. In various embodiments, a non-jamming shrink latch may further comprise a second rocker arm coupled to the cradle at a second outboard pivot and a second inboard pivot coupled to the second rocker arm opposite the second outboard pivot.

In various embodiments, the non-jamming shrink latch may further comprise a latch mechanism. In various embodiments, the latch mechanism comprises a detent rigidly mounted within a wheel well to an airframe. In various embodiments, one of the first rocker arm or the second rocker arm comprises a compression member. In various embodiments, in response to the compression member exerting a spring force, one of the first outboard pivot or second outboard pivot is driven into engagement with the detent. In various embodiments, the cradle comprises a stirrup.

In various embodiments, a system for fault tolerant strut shrink comprises an aircraft having an airframe and a wheel well comprising an envelope, a landing gear comprising a trunnion and a shrink strut having a strut piston coupled to an axle having a wheel, wherein the landing gear pivots about the trunnion, wherein the landing gear retracts into the wheel well in response to a command from a controller and the strut piston shrinks into the shrink strut in response to one of the retracting of the landing gear into the envelope of the wheel well or the command from the controller, a non-jamming shrink latch, comprising a cradle, a first rocker arm, a first inboard pivot, and a first outboard pivot; wherein the first inboard pivot is coupled to the first rocker arm at a first end and the first outboard pivot is coupled to the first rocker arm at a second end opposite the first end, wherein the cradle is coupled to the first outboard pivot, wherein the first inboard pivot is coupled to the airframe within the envelope of the wheel well.

In various embodiments, the system further comprises a second rocker arm coupled to the cradle at a second outboard pivot and a second inboard pivot coupled to the second rocker arm opposite the second outboard pivot In various embodiments, the non-jamming shrink latch further comprises a latch mechanism. In various embodiments, the latch mechanism comprises a detent rigidly mounted within the envelope of the wheel well to an airframe. In various embodiments, one of the first rocker arm or the second rocker arm comprises a compression member. In various embodiments, in response to the compression member exerting a spring force, one of the first outboard pivot or the second outboard pivot is driven into engagement with the detent. In various embodiments, the cradle comprises a stirrup. In various embodiments, in response to the strut piston extending over a first portion of a shrink stroke, the wheel is driven into contact with the stirrup thereby compressing one of the first rocker arm or the second rocker arm. In various embodiments, in response to the compressing the first rocker arm and the second rocker arm, the strut piston is inhibited from extending over the first portion of the shrink stroke. In various embodiments, in response to the landing gear pivoting away from the envelope about the trunnion, an interference between the cradle and the wheels compresses the strut piston over a second portion of the shrink stroke. In various embodiments, in response to the landing gear pivoting away from the envelope about the trunnion, the axle describes a first arc and the first outboard pivot and the second outboard pivot describe a second arc, wherein the wheel and the stirrup are contacted over a converging portion of the first arc and the second arc, wherein the contact between the wheel and the stirrup is broken over a diverging portion of the first arc and the second arc in response to the strut piston fully extending. In various embodiments, in response to a contact between the wheel and the stirrup breaking, the cradle is disposed outside the envelope.

In various embodiments, a method for manufacturing a non-jamming shrink latch is provided. The method may comprise: coupling a first end of a first rocker arm to a first inboard pivot and coupling a first outboard pivot at a second end of the first rocker arm opposite the first end of the first rocker arm, coupling a second inboard pivot to a first end of a second rocker arm and coupling a second outboard pivot at a second end of the second rocker arm opposite the first end of the second rocker arm, coupling a cradle between the first outboard pivot and the second outboard pivot, coupling the first inboard pivot and the second inboard pivot to an airframe of an aircraft within an envelope of a wheel well, and disposing the cradle proximate a wheel of a landing gear comprising a shrink strut.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 1:
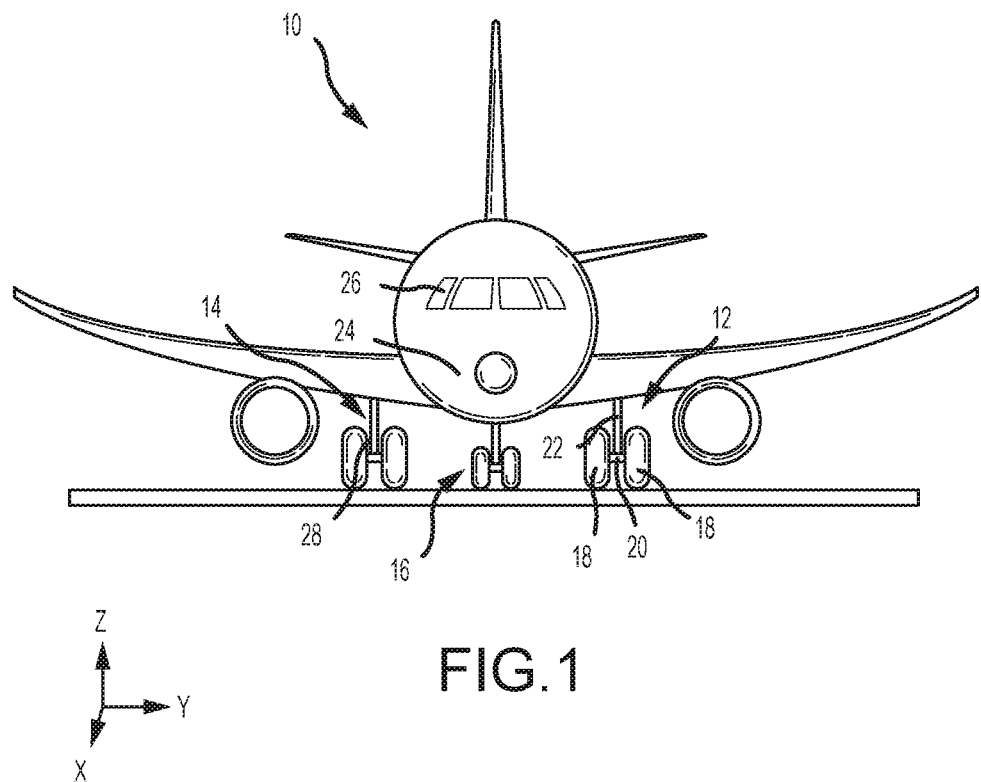
FIG. 1 illustrates an aircraft, in accordance with various embodiments.

With reference to FIG. 1, an aircraft 10 in accordance with various embodiments may comprise aircraft systems, for example, one or more landing gear landing gear such as landing gear 12, landing gear 14 and landing gear 16. Landing gear 12, landing gear 14 and landing gear 16 may generally support aircraft 10 when aircraft is not flying, allowing aircraft 10 to taxi, take off, and land without damage and may comprise wheels and an oleo strut, also referred to as a shock strut, comprising a strut cylinder and a strut piston filled with a hydraulic fluid. For example, landing gear 12 may include wheels 18 coupled by an axle 20 and a shock strut 22. An XYZ axes is used throughout the drawings to illustrate the forward (x), inboard (y), and vertical (z) directions relative to aircraft 10. In various embodiments, shock strut 22 may comprise a stroke length defined by a limit of the travel (along the z-axis relative to the extended position of landing gear 12) of the strut piston within the strut cylinder. In various embodiments, in response to a load such as, for example, a landing load, the shock strut 22 be compressed and the strut piston may travel over a portion of the stroke length tending thereby to attenuate the load. In various embodiments, shock strut 22 may comprise a shrinking mechanism tending to enable the strut piston to retract upward (with respect to the z-axis) into the strut cylinder. In other words, a shock strut comprising a shrink mechanism may shrink and may also be referred to as a shrinking strut or a shrink strut. In various embodiments, a strut piston of a shrink strut may shrink by a shrink stroke which is a portion less than the stroke length sufficient to allow a landing gear, such as landing gear 12, to fit within an undersized wheel well of aircraft 10.

Aircraft 10 may comprise controller 24, cockpit controls 26, sensors 28. In various embodiments, landing gear 14, landing gear 16, and landing gear 12 may be in communication with controller 24 and may receive commands (e.g. retract) from controller 24, for example, to extend or retract. In various embodiments, controller 24 may be in electronic communication with cockpit controls 26 or may be in electronic communication with sensors such as, for example, a weight-on-wheels (WOW) sensor and may issue commands in response to cockpit controls 26 or data and/or other feedback from the sensors. The sensors may provide aircraft speed, wheel speed, brake temperature, hydraulic pressure, air pressure, acceleration, and/or any other suitable input data. The controller 24 may receive signals or commands from a pilot or from any other suitable onboard sensors known to those skilled in the art. In various embodiments, the controller may be located in the fuselage of the aircraft and may coordinate various inputs in order to issue commands to the landing gear. In various embodiments, a shrink strut such as shrink strut 22 may shrink in response to commands from controller 24 and may unshrink in response to commands from controller 24. In various embodiments, when a landing gear such as landing gear 12 is commanded to retract and a shrink strut such as shrink strut 22 is commanded to shrink, shrink strut 22 may unshrink in response to a failure mode of the shrink mechanism. In other words, a shrink strut may experience an uncommanded unshrink event. In various embodiments, when an uncommanded unshrink event occurs while a landing gear comprising a shrink strut, such as landing gear 12 comprising shrink strut 22, is within an undersized wheel well, the landing gear may tend to bind or jam within the undersized wheel well and, in response, may tend to fail to deploy or extend in response to a command from a controller such as controller 24.

Figure 2A:
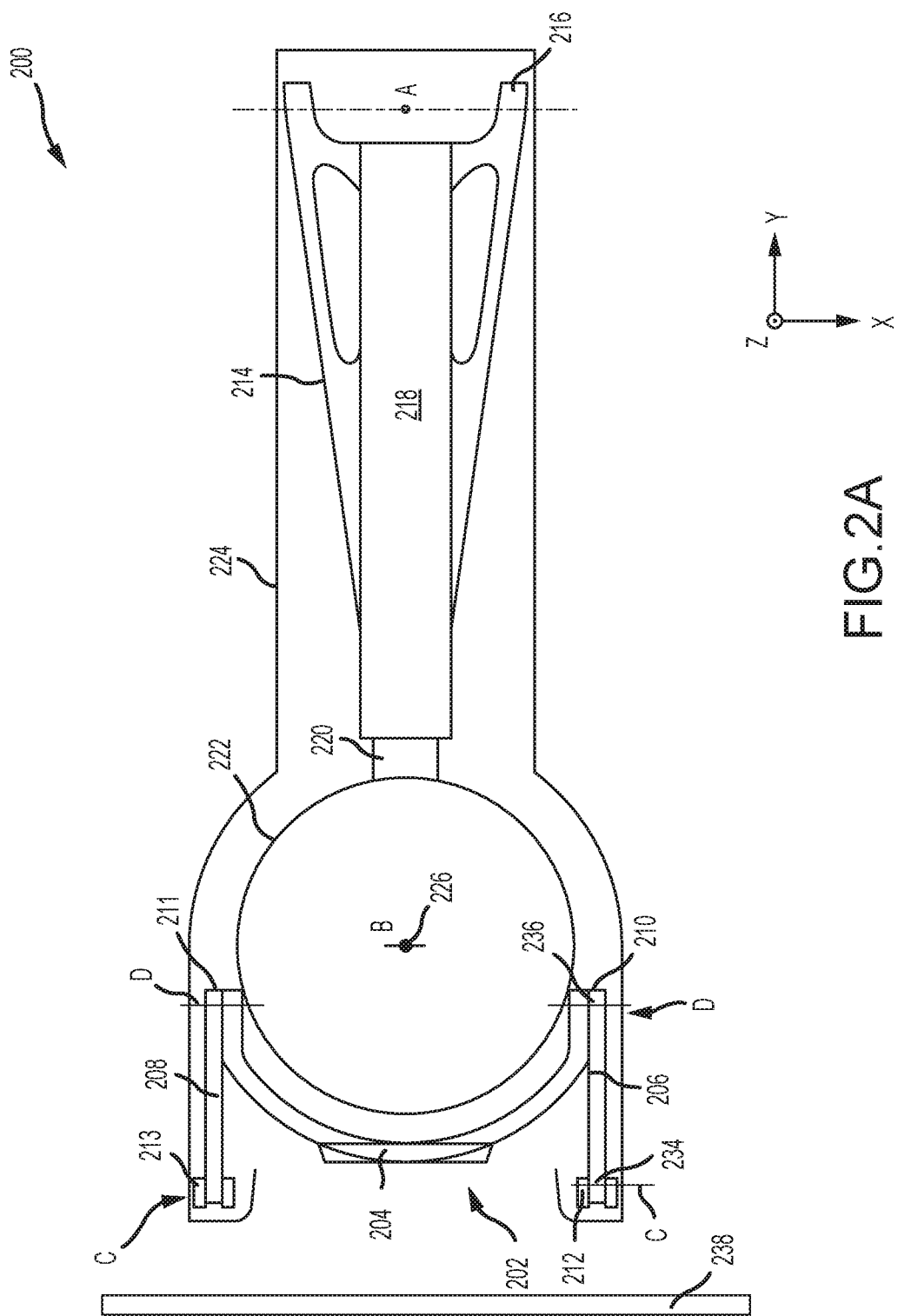
FIG. 2A illustrates a non-jamming shrink latch, in accordance with various embodiments

In various embodiments and with additional reference to FIG. 2A, an undersized wheel well 200 of an aircraft such as aircraft 10 is shown in the x-y plane comprising a non-jamming shrink latch 202 located within the envelope 224 of wheel well 200. In various embodiments, non-jamming shrink latch comprises a cradle 204, a forward rocker arm 206, and an aft rocker arm 208. Forward rocker arm 206 is coupled to the aircraft via inboard pivot 212 at a first end 234 of rocker arm 206 and to cradle 204 at a second end 236 opposite the first end of rocker arm 206 via outboard pivot 210. In like manner, aft rocker arm 208 is coupled to cradle 204 at outboard pivot 211 and to the aircraft at inboard pivot 213. Inboard pivot 212 and inboard pivot 213 are positioned at points C relative to an airframe 238 of the aircraft and outboard pivot 210 and outboard pivot 211 are positioned at points D relative to the airframe 238 of the aircraft. Landing gear 214 comprising shrink strut 218 strut piston 220 and wheels 222 coupled to axle 226 are shown fully shrunk and retraced within the envelope 224 of wheel well 200. Landing gear 214 comprises trunnion 216 located outboard (with respect to the y-axis) of point C and pivots at trunnion 216 about a trunnion axis A parallel to the x-axis. In various embodiments, when landing gear 214 is commanded to retract and shrink strut 218 is commanded to shrink, axle 226 lies within envelope 224 at a position B relative to the airframe and wheels 222 are not in contact with non-jamming shrink latch 202. In various embodiments, landing gear 214 may extend in response to a command from a controller such as controller 24 and pivot about axis A. In response to the landing gear pivoting about axis A, axle 226 describes a first arc in the z-y plane and swings along the first arc without wheels 222 contacting non-jamming shrink latch 202.

Figure 2B:
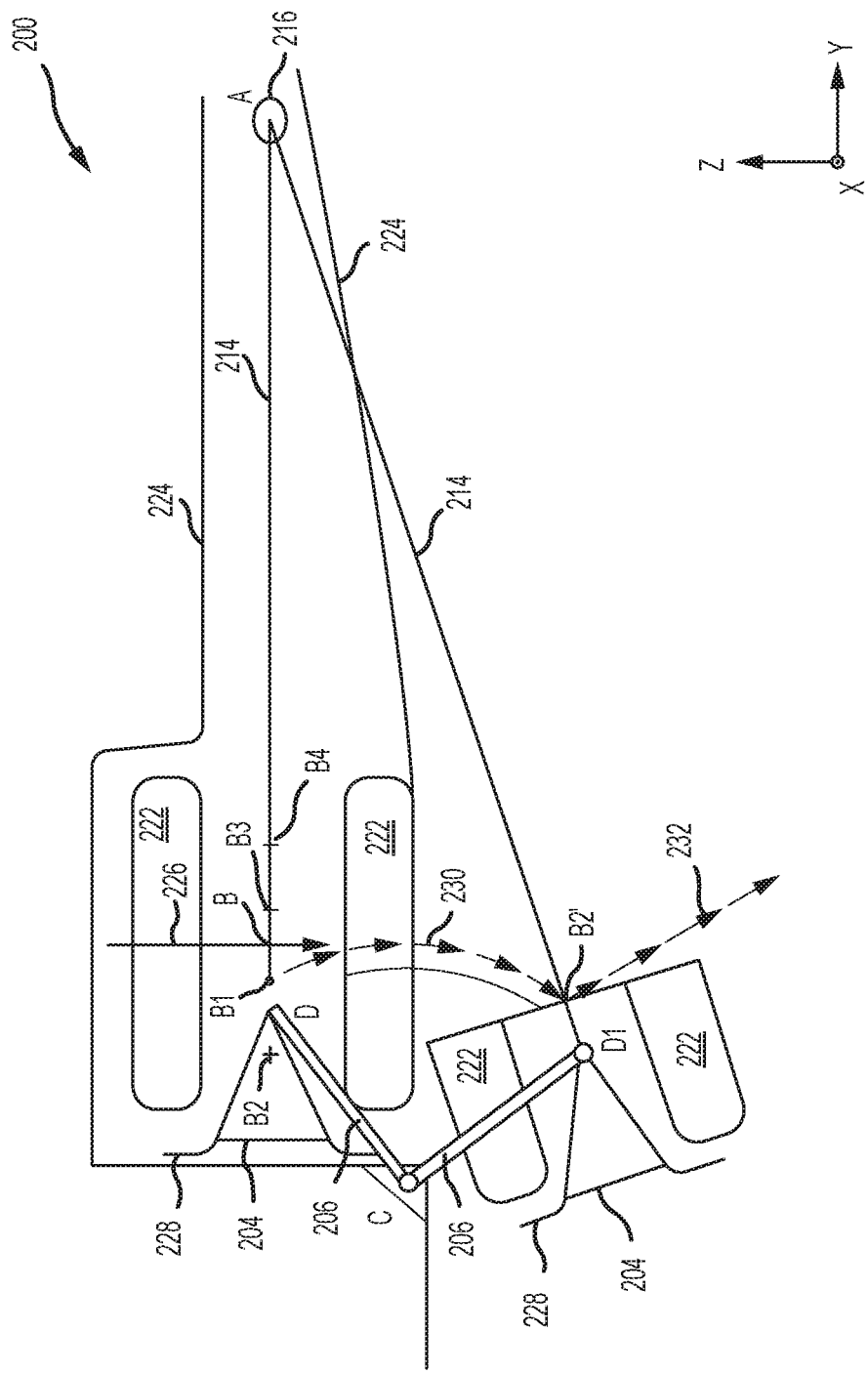
FIG. 2B illustrates a non-jamming shrink latch, in accordance with various embodiments.
Figure 3A:
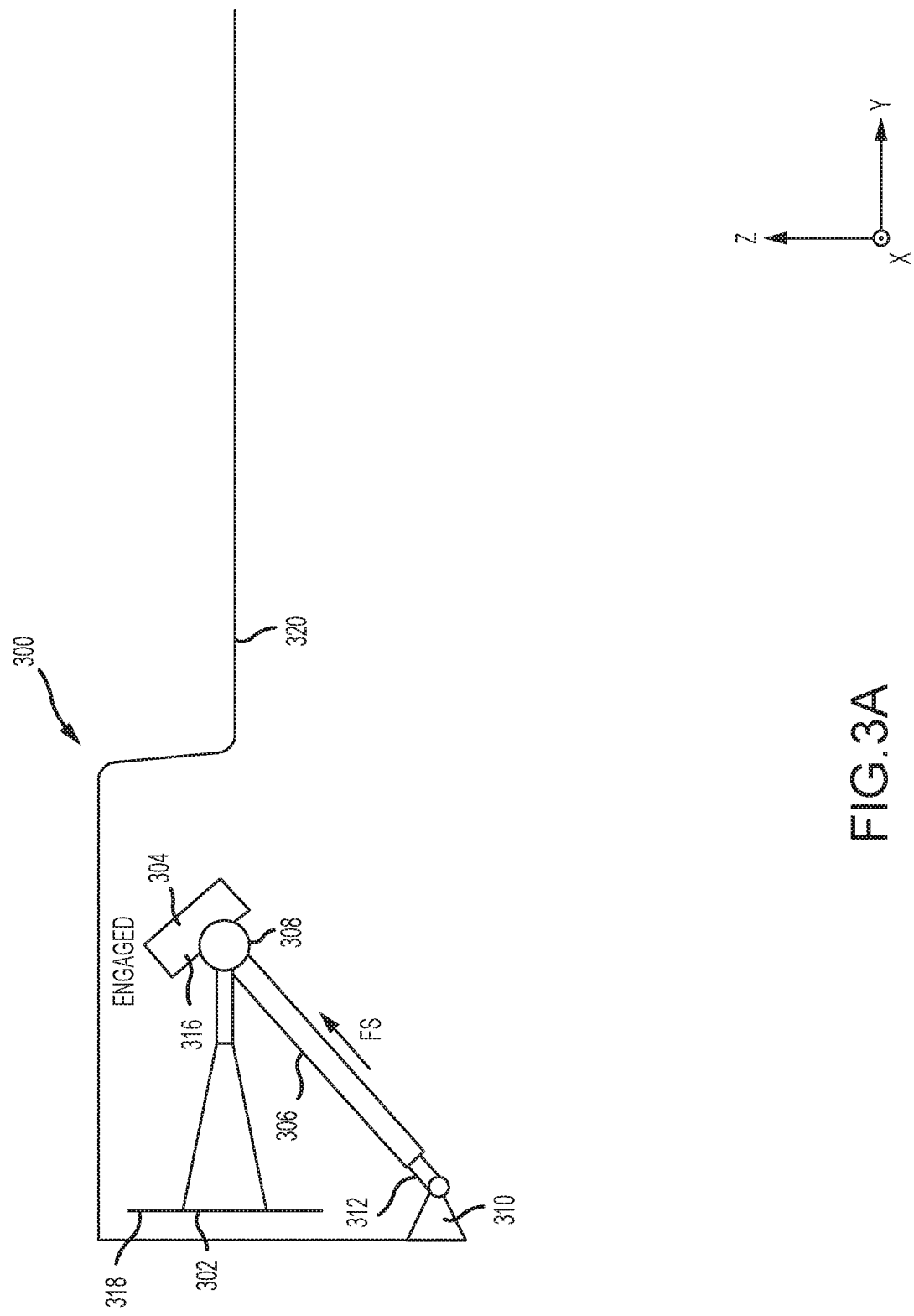
FIG. 3A illustrates a non-jamming shrink latch, in accordance with various embodiments.
Figure 3B:
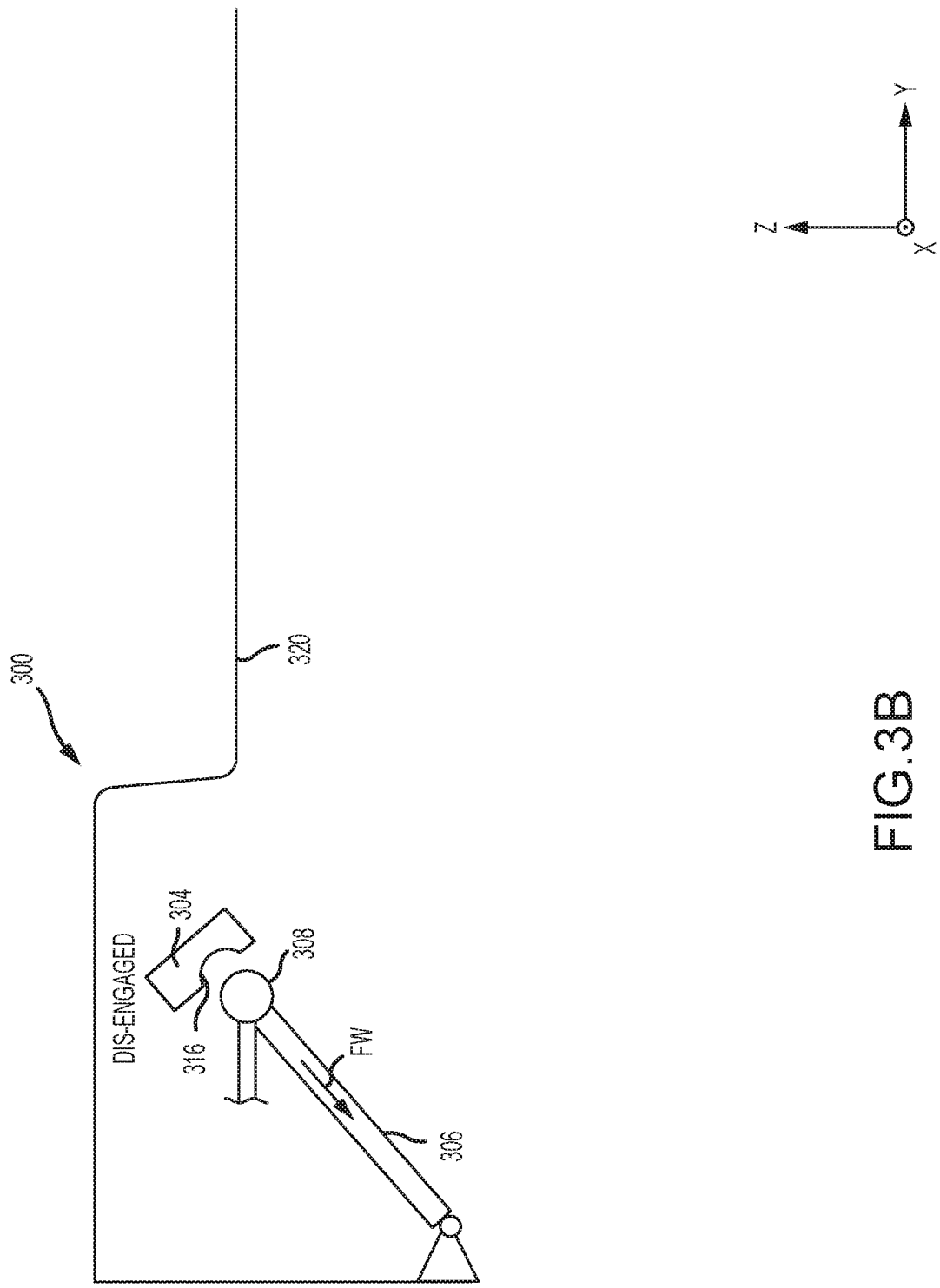
FIG. 3B illustrates a non-jamming shrink latch, in accordance with various embodiments.
Figure 3C:
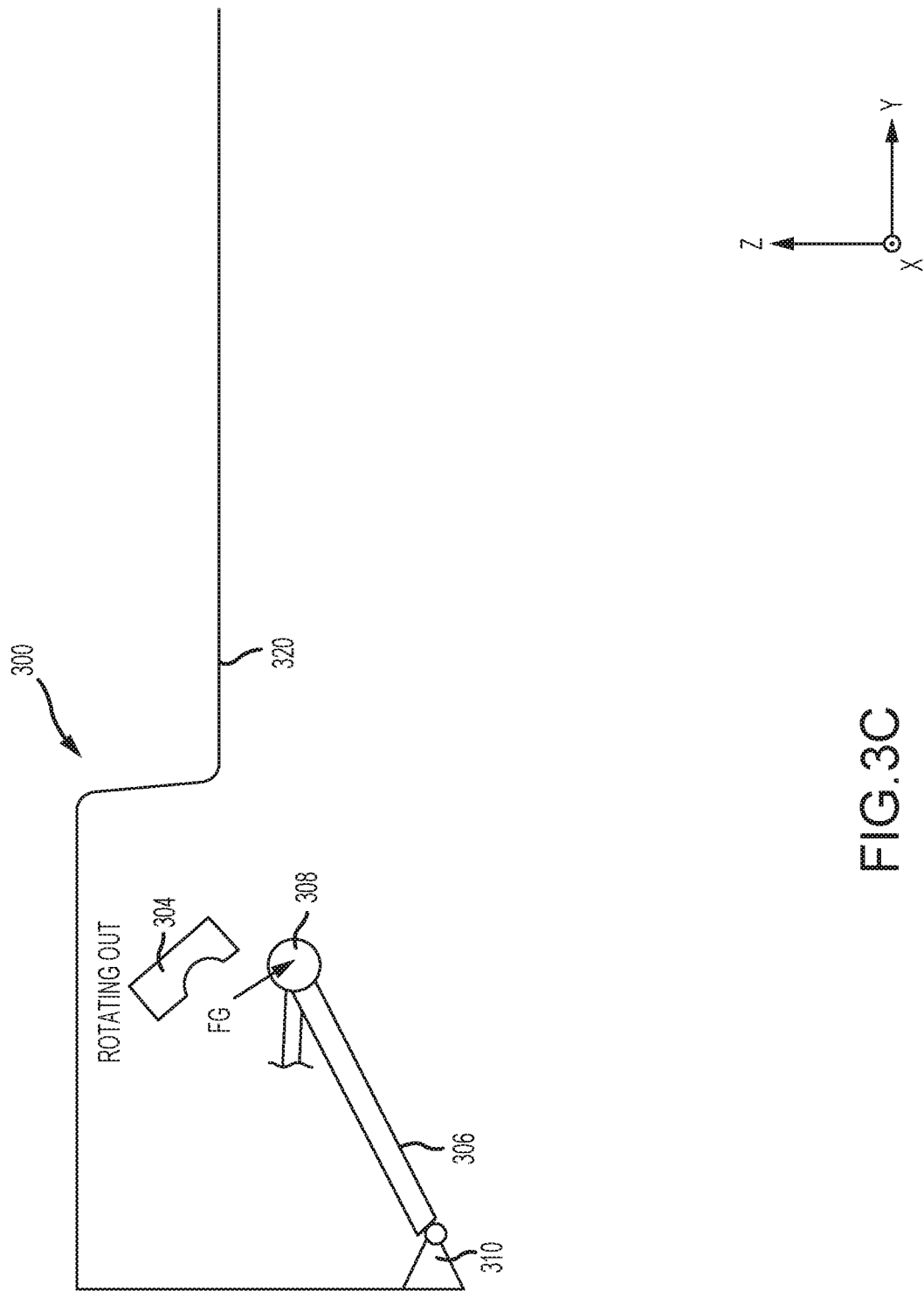
FIG. 3C illustrates a non-jamming shrink latch, in accordance with various embodiments.
Figure 3D:
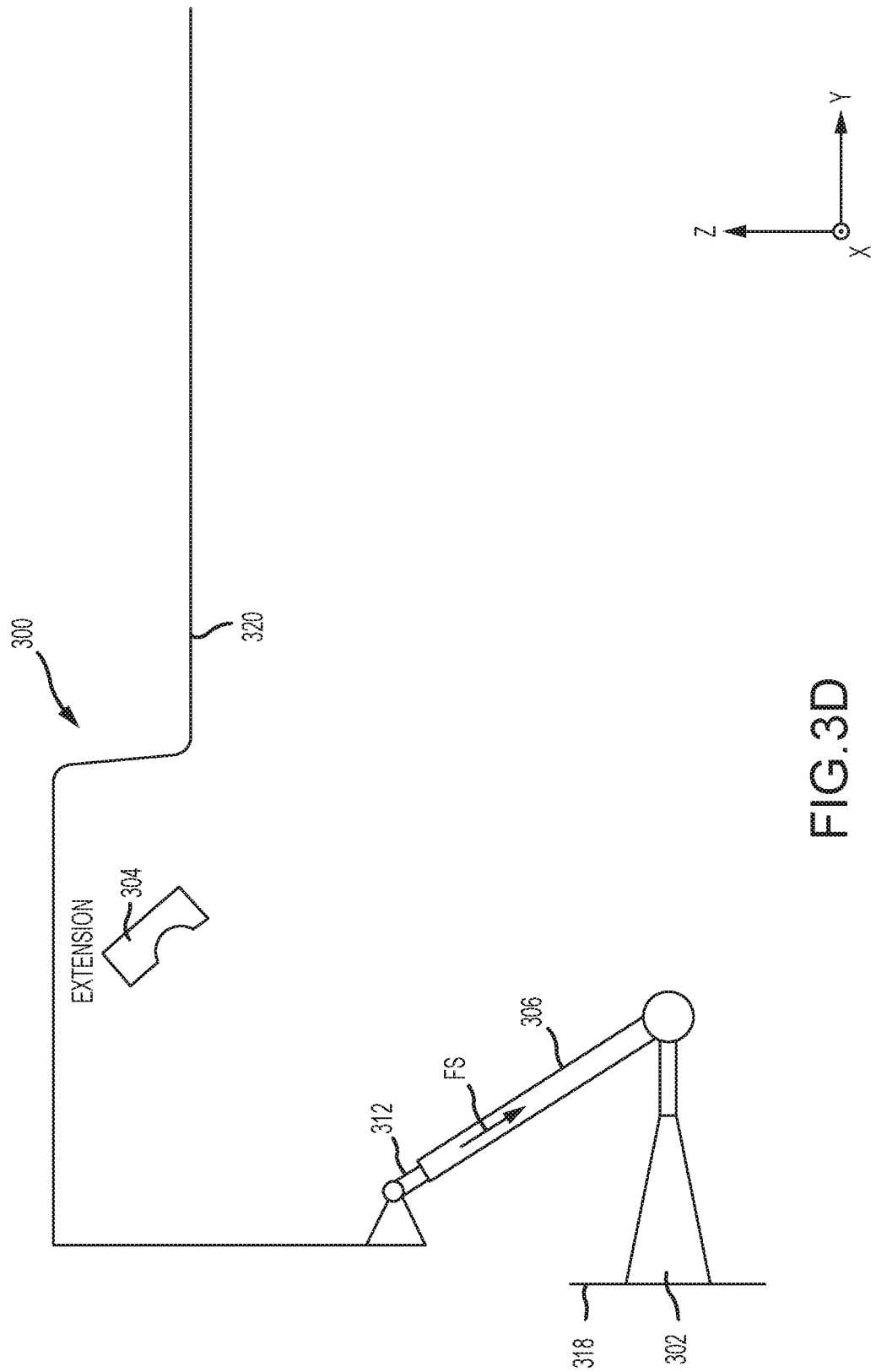
FIG. 3D illustrates a non-jamming shrink latch, in accordance with various embodiments.

In various embodiments and with additional reference to FIG. 2B, wheel well 200 of an aircraft such as aircraft 10 is shown in the z-y plane. Cradle 204 of non-jamming shrink latch 202 further comprises stirrups 228 located relatively inboard of wheels 222. In various embodiments, landing gear 214 may experience an uncommanded unshrink event. In response to the uncommanded unshrink event, strut piston 220 (FIG. 2A) tends to extend over the shrink stroke and drive axle 226 from position B toward a fully unshrunk position B2. In response to the movement of the axle, wheels 222 may be driven into contact with stirrups 228 and compress forward rocker arm 206 and aft rocker arm 208. In response to the compression of the forward rocker arm 206 and the aft rocker arm 208, the non-jamming shrink latch may unlatch and arrest axle 226 at position B1 tending thereby to inhibit wheels 222 from coming into contact with envelope 224 of wheel well 200 and tending to inhibit strut piston 220 from extending over a first portion of the shrink stroke. In various embodiments, landing gear 214 may extend in response to a command from a controller such as controller 24 and pivot about axis A. In response to the landing gear pivoting about axis A, axle 226 describes a second arc in the z-y plane between points B1 and B2' (as indicated by arrows 230) and swings along the second arc with wheels 222 in contact with stirrups 228 until contact with wheels 222 is broken at point B2'. As landing gear 214 extends, an interference between cradle 204 and wheels 222 tends to drive axle 226 toward position B3 (radially toward axis A) and, in response, compressing strut piston 220 over a second portion of shrink the stroke tending thereby to allow wheels 222 to clear the envelope 224 of wheel well 200. In response to contact with wheels 222 and landing gear 214 extending, non-jamming shrink latch 202 rotates about inboard pivots 212 and 213 at point C and, in response, outboard pivots 210 and 211 describe a third arc between points D and D1 relative to the airframe of the aircraft.

In response to outboard pivot 210 and outboard pivot 211 describing the third arc between points D an D1, wheels 222 swing clear of envelope 224 of wheel well 200 and strut piston 220 fully extends over the shrink stroke driving axle 226 to position B2'. In response to strut piston 220 fully extending, the interference between cradle 204 and wheels 222 is broken and stirrups 228 break contact with wheels 222. In response to stirrups 228 breaking contact with wheels 222, outboard pivots 210 and 211 progress toward point D1 tending thereby to move cradle 204 away from wheels 222 and, in response, tending to allow landing gear 214 to extend without recontacting cradle 204 as indicated by axle path arrows 232. Stated another way, in response to forward rocker arm 206 and aft rocker arm 208 rotating far enough about their respective pivots (inboard pivot 212 and inboard pivot 213) to enable the strut piston to reach its full length (i.e. the unshrunk position), wheels 222 begin to lose contact with stirrups 228 and further rotation of forward rocker arm 206 and aft rocker arm 208 about their respective pivots tends to create clearance tending to allow landing gear 214 to continue unimpeded to a down and locked position. In various embodiments, in response to an uncommanded unshrink event, non-jamming shrink latch 202 remains disposed outside envelope 224 of wheel well 200 when landing gear 214 is in an extended state. In this regard, a non-jamming shrink latch such as non-jamming shrink latch 202 may serve as a visual indicator of an uncommanded unshrink event and may be manually reset within an envelope of a wheel well.

In various embodiments and with additional reference to FIGS. 3A-3D, a non-jamming shrink latch 300 is shown in the z-y plane. Non-jamming shrink latch 300 comprises features, materials, geometries, manufacturing techniques, and/or internal components similar to non-jamming shrink latch 202 as illustrated in FIGS. 2A and 2B. Non-jamming shrink latch 300 comprises cradle 302, latch mechanism 304 mounted within envelope 320 of a wheel well, and rocker arm 306. Rocker arm 306 comprises a compression member 312, an inboard pivot 310, and an outboard pivot 308. In various embodiments, compression member 312 exerts a spring force $F_S$ which drives outboard pivot 308 into engagement with detent 316 of latch mechanism 304. In various embodiments, in response to an uncommanded unshrink event, wheels such as wheels 222 may be driven into contact with stirrups 318 and, in response, generate a component of force $F_W$ along rocker arm 306 tending to overcome $F_S$ and compress compression member 312. In response, outboard pivot 308 tends to be driven away and disengage from detent 316. In various embodiments, in response to an extension of a landing gear a component of force $F_G$ may be generated about outboard pivot 308 tending to drive rocker arm 306 relatively downward (with respect to the z-axis) away from latch mechanism 304 and pivot about the inboard pivot 310. In various embodiments, in response to the removal of $F_W$ and $F_G$, $F_S$ tends to extend compression member 312.

In various embodiments, non-jamming shrink latch such as non-jamming shrink latch 202 or non-jamming shrink latch 300 may comprise at least one of a metal, an alloy, steel, stainless steel, aluminum, aluminum alloy, titanium, and/or titanium alloy. In various embodiments a rotation of a cradle about an outboard pivot may be limited with respect to a geometry of an airframe, a geometry of a landing gear, or an envelope of a wheel well. In various embodiments the rotation of a rocker arm about an inboard pivot may be limited with respect to a geometry of an airframe, a geometry of a landing gear, or an envelope of a wheel well. In various embodiments, a compression member such as compression member 312 may comprise at least one of a coil spring, a gas strut, a gas spring, or a mechanical strut. In various embodiments, a detent such as detent 316 may be rigidly mounted to an airframe such as airframe 238.

Figure 4:
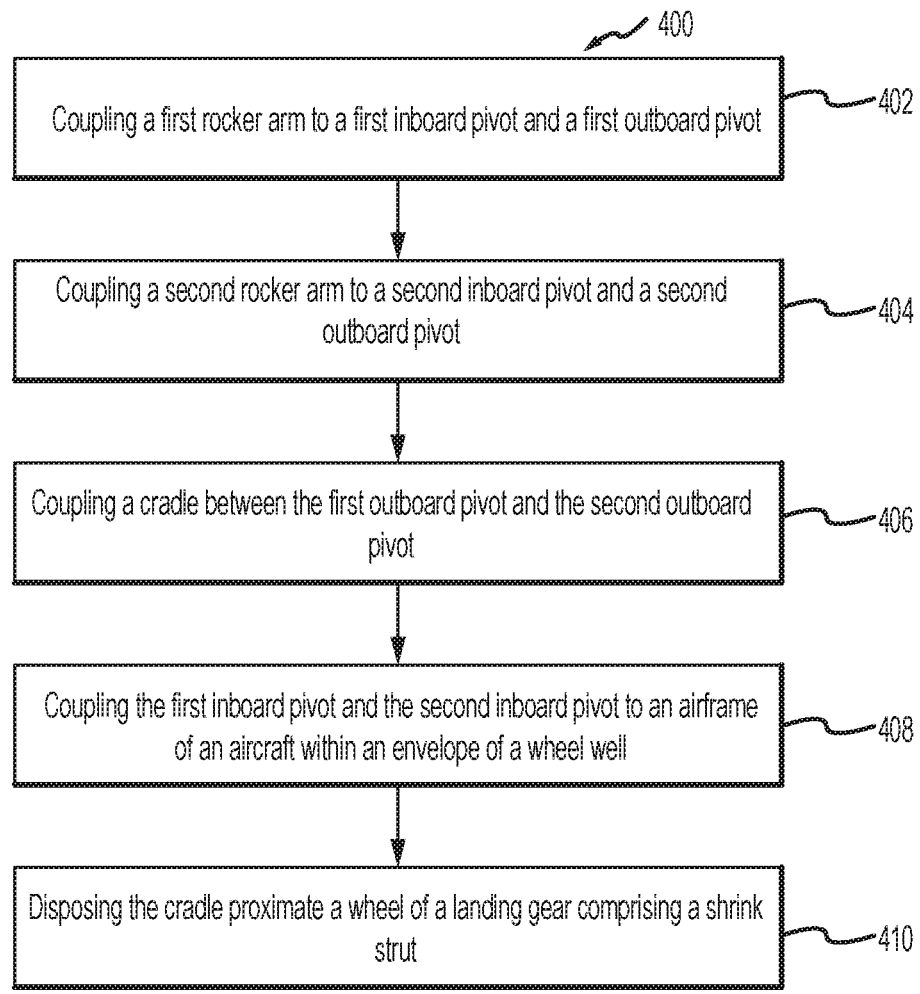
FIG. 4 illustrates a process flow for a method of manufacturing a non-jamming shrink latch, in accordance with various embodiments.

With reference to FIG. 4, a method 400 for manufacturing a non-jamming shrink latch is illustrated in accordance with various embodiments. Method 400 includes coupling a first end of a first rocker arm to a first inboard pivot and coupling a first outboard pivot at a second end of the first rocker arm opposite the first end of the first rocker arm (402), coupling a second inboard pivot to a first end of a second rocker arm and coupling a second outboard pivot at a second end of the second rocker arm opposite the first end of the second rocker arm (404), coupling a cradle between the first outboard pivot and the second outboard pivot (406), coupling the first inboard pivot and the second inboard pivot to an airframe of an aircraft within an envelope of a wheel well (408), and disposing the cradle proximate a wheel of a landing gear comprising a shrink strut (410).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A safety apparatus for a landing gear assembly of an aircraft having a shrink strut, comprising:

a cradle, a first rocker arm, a first inboard pivot, and a first outboard pivot;

wherein the first inboard pivot is coupled to the first rocker arm at a first end and the first outboard pivot is coupled to the first rocker arm at a second end opposite the first end;

a second rocker arm coupled to the cradle at a second outboard pivot and a second inboard pivot coupled to the second rocker arm opposite the second outboard pivot, wherein the cradle comprises a stirrup; and wherein the cradle is coupled to the first outboard pivot, wherein the cradle is configured to retain a wheel of the landing gear assembly in response to an extension of the shrink strut, wherein, in response to the strut piston extending over a first portion of a shrink stroke, the wheel is driven into contact with the stirrup thereby compressing at least one of the first rocker arm or the second rocker arm.

2. The apparatus of claim 1, further comprising a latch mechanism.

3. The apparatus of claim 2, wherein the latch mechanism comprises a detent rigidly mounted within a wheel well to an airframe.

4. The apparatus of claim 3, wherein at least one of the first rocker arm or the second rocker arm comprises a compression member.

5. The apparatus of claim 4, wherein, in response to the compression member exerting a spring force, at least one of the first outboard pivot or second outboard pivot is driven into engagement with the detent.

6. A system for a fault tolerant strut shrink, comprising:

an aircraft having an airframe and a wheel well comprising an envelope;

a landing gear comprising a trunnion and a shrink strut having a strut piston coupled to an axle having a wheel;

wherein the landing gear pivots about the trunnion, wherein the landing gear retracts into the wheel well in response to a command from a controller and the strut piston shrinks into the shrink strut in response to at least one of the retracting of the landing gear into the envelope of the wheel well or the command from the controller;

a non-jamming shrink latch, comprising a cradle, a first rocker arm, a first inboard pivot, and a first outboard pivot; wherein the first inboard pivot is coupled to the first rocker arm at a first end and the first outboard pivot is coupled to the first rocker arm at a second end opposite the first end, wherein the cradle is coupled to the first outboard pivot, wherein the first inboard pivot is coupled to the airframe within the envelope of the wheel well, a second rocker arm coupled to the cradle at a second outboard pivot and a second inboard pivot coupled to the second rocker arm opposite the second outboard pivot, wherein the cradle comprises a stirrup, wherein the cradle is configured to retain the wheel of the landing gear assembly in response to an extension of the shrink strut, and wherein, in response to the strut piston extending over a first portion of a shrink stroke, the wheel is driven into contact with the stirrup thereby compressing at least one of the first rocker arm or the second rocker arm.

7. The system for fault tolerant strut shrink of claim 6, wherein the non-jamming shrink latch further comprises a latch mechanism.

8. The system for fault tolerant strut shrink of claim 7, wherein the latch mechanism comprises a detent rigidly mounted within the envelope of the wheel well to an airframe.

9. The system for fault tolerant strut shrink of claim 8, wherein at least one of the first rocker arm or the second rocker arm comprises a compression member.

10. The system for fault tolerant strut shrink of claim 9, wherein, in response to the compression member exerting a spring force, at least one of the first outboard pivot or the second outboard pivot is driven into engagement with the detent.

11. The system for fault tolerant strut shrink of claim 6, wherein, in response to the strut piston extending over a first portion of a shrink stroke, the wheel is driven into contact with the stirrup thereby compressing at least one of the first rocker arm or the second rocker arm.

12. The system for fault tolerant strut shrink of claim 11, wherein, in response to the compressing the first rocker arm and the second rocker arm, the strut piston is inhibited from extending over the first portion of the shrink stroke.

13. The system for fault tolerant strut shrink of claim 12, wherein, in response to the landing gear pivoting away from the envelope about the trunnion, an interference between the cradle and the wheels compresses the strut piston over a second portion of the shrink stroke.

14. The system for fault tolerant strut shrink of claim 13, wherein, in response to the landing gear pivoting away from the envelope about the trunnion, the axle defines a first arc and the first outboard pivot and the second outboard pivot defines a second arc, wherein the wheel and the stirrup are contacted over a converging portion of the first arc and the second arc, wherein the contact between the wheel and the stirrup is broken over a diverging portion of the first arc and the second arc in response to the strut piston fully extending.

15. The system for fault tolerant strut shrink of claim 14, wherein, in response to the contact between the wheel and the stirrup breaking, the cradle is disposed outside the envelope.

16. A method of manufacturing a non-jamming shrink latch, comprising:
    coupling a first end of a first rocker arm to a first inboard pivot and coupling a first outboard pivot at a second end of the first rocker arm opposite the first end of the first rocker arm,
    coupling a second inboard pivot to a first end of a second rocker arm and coupling a second outboard pivot at a second end of the second rocker arm opposite the first end of the second rocker arm,
    coupling a cradle between the first outboard pivot and the second outboard pivot, coupling the first inboard pivot and the second inboard pivot to an airframe of an aircraft within an envelope of a wheel well, and
    disposing the cradle proximate a wheel of a landing gear comprising a shrink strut having a strut piston,
    wherein the cradle is configured to contact and retain the wheel of the landing gear in response to an extension of the shrink strut,
    wherein the cradle comprises a stirrup, and
    wherein, in response to the strut piston extending over a first portion of a shrink stroke, the wheel is driven into contact with the stirrup thereby compressing at least one of the first rocker arm or the second rocker arm.

* * * * *